Dec. 1, 1953  L. F. HOFER  2,661,177
ADJUSTABLE MOUNTING FOR REARVIEW MIRRORS
Filed Oct. 5, 1948  3 Sheets-Sheet 1

Inventor
Lawrence F. Hofer
By
Nobbe & Swope
Attorneys

Dec. 1, 1953  L. F. HOFER  2,661,177
ADJUSTABLE MOUNTING FOR REARVIEW MIRRORS
Filed Oct. 5, 1948  3 Sheets-Sheet 2

Inventor
Laurence F. Hofer
By Nobbe & Swope
Attorneys

Dec. 1, 1953      L. F. HOFER      2,661,177
ADJUSTABLE MOUNTING FOR REARVIEW MIRRORS

Filed Oct. 5, 1948      3 Sheets-Sheet 3

Inventor
Laurence F. Hofer
By
Nobbe & Swope
Attorneys

Patented Dec. 1, 1953

2,661,177

UNITED STATES PATENT OFFICE 2,661,177

ADJUSTABLE MOUNTING FOR REARVIEW MIRRORS

Laurence F. Hofer, Portland, Oreg.

Application October 5, 1948, Serial No. 52,810

19 Claims. (Cl. 248—291)

This invention relates to improvements in rear view mirrors which are used in automobiles, and more particularly to the mounting thereof.

The primary purpose in the use of a rear view automobile mirror is of course to provide the driver with a satisfactory view of the rear road under the various conditions of driving. Heretofore, rear view mirrors have had to be designed with reflectivities which gave a reasonably acceptable compromise for most drivers between glare elimination and visibility. Thus, lead sulfide mirrors, having a reflectivity of about 30% and which represent by far the greatest number of rear view mirrors in use today, are objected to by many drivers as producing intolerable glare in night driving, while many others consider their reflectivity as too low for day driving.

For day driving a reflectivity of over 30%, preferably in the range of 40% to 60%, is quite useful. For night driving, however, lower reflectivities are necessary to prevent glare. A mirror of reflectivity between approximately 10% and 30%, preferably between 18% and 22%, has been found to provide ideal glare removal while providing excellent rear road visibility for most drivers. The provision of a mirror for night driving with a single fixed reflectivity in this range, as in prior used rear view automobile mirrors, has represented a compromise which has been unsuitable for many drivers due to the great variation in the ability of human eyes to withstand glare and in the ability to see at various light intensities. It has also been unsuitable for preventing glare from extremely high light intensity conditions.

A mirror providing a choice of two reflections of approximately 75% for day driving and approximately 4.25% for night driving has been liked by many drivers for the increased daytime reflectivity except in sun and snow glare conditions. However, it has been generally found that the approximately 4.25% reflectivity available for night driving while removing glare has been of little use since seeing ability was simultaneously removed.

In the copending application of Dwight W. Barkley, filed November 26, 1947, Serial No. 788,120, now abandoned, there is disclosed and claimed an improved type of prismatic rear view mirror device which provides the automobile driver with a personal selection of three or more intensities of images of the rear road conditions. Such a mirror permits the driver to make a choice of the images of various brightness, each image being of the common limited rear field of view so as to obtain maximum visibility with the minimum glare best suited to his particular personal eye glare tolerance and visual acuity under all the varying light intensities present under modern night and day driving conditions.

The mirror device, which is the subject of said copending Barkley application, provides for abnormal driving conditions and for the wide variations in eye sensation of automobile drivers by providing at least three images of the rear road conditions which the driver may select as the rear lighting conditions and his eye sensitivity to glare and visibility vary. The choice of image intensity suitable to the driver is made by his selectively positioning the prismatic rear view mirror by angular adjustment to alternately locate the various images of differing intensities of the same limited common field of rear view in the normal line of sight of the driver as he sits in driving position in the car. Thus, the rear view mirror may provide a choice of at least three image intensities which may be, for example, of over 30%, between 10% and 30% approximately, and of over 4.5% up to 12% approximately of the incident light falling upon the rear view mirror and coming from the rear view of the road, etc.

This invention is primarily concerned with the mounting of the improved type of mirror disclosed in the above copending application and has for its primary objective the provision of a special mounting by which the mirror may be angularly adjusted to predetermined positions to selectively locate any one of three different image intensities of the same limited common field of view in the normal line of sight of the driver.

Another object of this invention is the provision of such a mounting for a rear view mirror embodying simple yet effective means by which the driver may angularly adjust the mirror to predetermined positions at will to selectively locate in the predetermined position of the driver's eyes the first, second and third images of the common rear field view.

Another object of the invention is the provision of such a mounting so constructed that the rear view mirror can be readily and conveniently tilted upwardly or downwardly by the driver within a controlled arc to bring any one of the three images of various intensities into the line of vision of the driver and including means for insuring maintenance of the mirror in selected position.

A further object of the invention is the provision of a mounting for a rear view mirror embodying means enabling tilting movement of the mirror to any one of three positions by finger tip control to give the desired intensity of image, without disturbing the adjustment of the mirror in relation to the driver, and for effectively maintaining the mirror in selected position.

A still further object of the invention is the provision of actuating means which permits shifting of the mirror to its different positions easily and quickly with a minimum of effort and attention on the part of the driver, together with means coacting with said actuating means to prevent accidental displacement of the mirror from its selected position.

Other objects and advantages of the invention will become more apparent during the course of the following description, when taken in connection with the accompanying drawings.

In the drawings wherein like numerals are employed to designate like parts throughout the same:

As explained in detail in the above-noted copending application, the mirror comprises at least two mirror reflecting surfaces or reflective means associated with each other and arranged, one behind the other, with either their lower or upper edges in converging relationship and with the other edges more widely spaced apart. Thus, the mirror reflective means or coatings deposited upon front and rear supporting surfaces are arranged in a non-parallel relationship to provide a prism or a support of prism form. As a suitable support for the mirror reflective means or coatings, there may be employed transparent bodies such as glass or plastic prisms or sheets of the same arranged in prism forms, the sheets being held in close and fixed or fastened angular relationship by a frame.

The angle between the two mirror reflective means or coatings, which form a front and a rear mirror disposed at such angle to each other, is preferably of the order of three and one-fourth degrees, although there may readily be used an angular separation between the two mirrors of from two to ten degrees or more. The smaller angular separations are preferable where solid prism supports are employed and the larger angular separations of close to ten degrees are preferable and give somewhat more convenient operation when a prism form composed of glass sheets is used.

Figure 1:
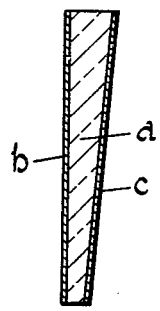
Fig. 1 is a vertical sectional view through a mirror made from a wedge shaped piece of glass.
Figure 2:
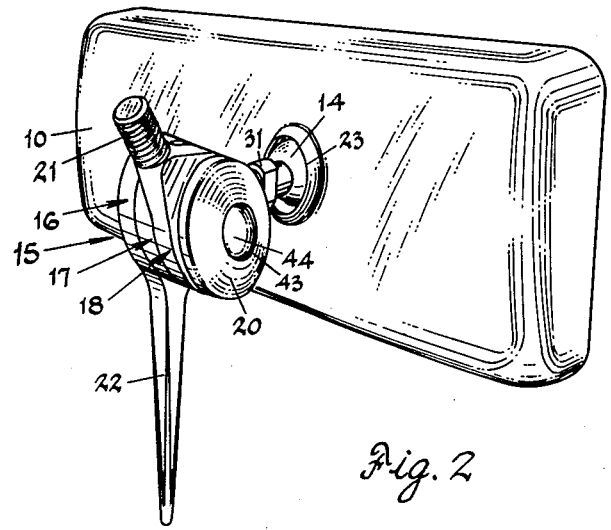
Fig. 2 is a perspective view of a mirror mounting constructed in accordance with the present invention.

By way of example, the mirror in Fig. 1 consists of a support of glass or other transparent material $a$ which is wedge shaped in vertical cross section. The back surface of the support $a$ carries a highly reflective mirror film means $b$ which, as a coating on a plane sheet of glass, would have a reflectivity preferably ranging from 50% to 95% or more. The front surface of this support carries a mirror reflective film means $c$.

The front reflective film means $c$ is semi-transparent and of preferably substantially no light aborption. It may be of a reflectivity of 10% to 30% and in such cases might be used in normal night driving and in daytime driving under snow and sun glare conditions. Or, the front reflective film means may be of higher reflectivity of up to an approximate maximum of 70%, in which case this front mirror of 30% to 70% substantially will be employed largely as a day driving mirror. The rear reflective film means $b$ is preferably opaque, although it may also be semi-transparent, but if so preferably of less transparency than film means $c$. If the film means $b$ is transparent, it may or may not be backed with an opaque coating.

Figure 9:
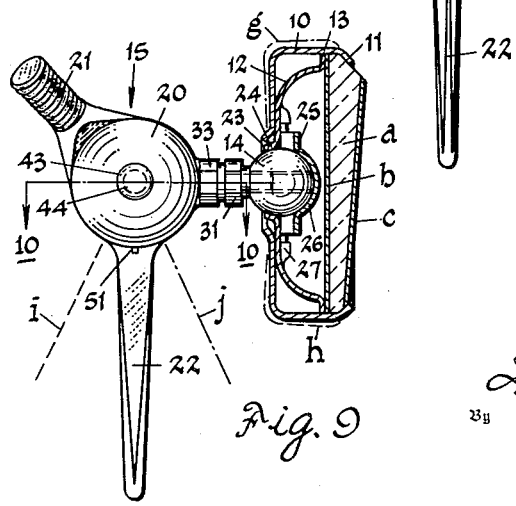
Fig. 9 is an end view of the mirror mounting, partially in cross section.

According to this invention, the mirror of Fig. 1 is carried by a substantially rectangular metal housing or case 10 open at the front thereof and in which opening the mirror is arranged and held against forward displacement by the peripheral flange 11 of said case which is bent over the edges of the mirror as best shown in Fig. 9. To hold the mirror against rearward displacement, there is arranged within the case 10 a metal backing plate 12, the flanged peripheral edge 13 of which engages the back of the mirror. If desired, a protective sheet or layer of paper or other suitable material can be interposed between the back of the mirror and the flange 13.

To provide for mounting the mirror in a vehicle so that it may be adjusted to properly position the reflecting surfaces $b$ and $c$ for different drivers, the case 10 is carried on the truncated ball 14 of the special tiltable mirror mounting designated in its entirety by the numeral 15 and constituting the subject matter of this invention. No claim is made herein to the particular type of mirror per se or to the materials for or the make-up and arrangement of the reflective coatings.

Figure 3:
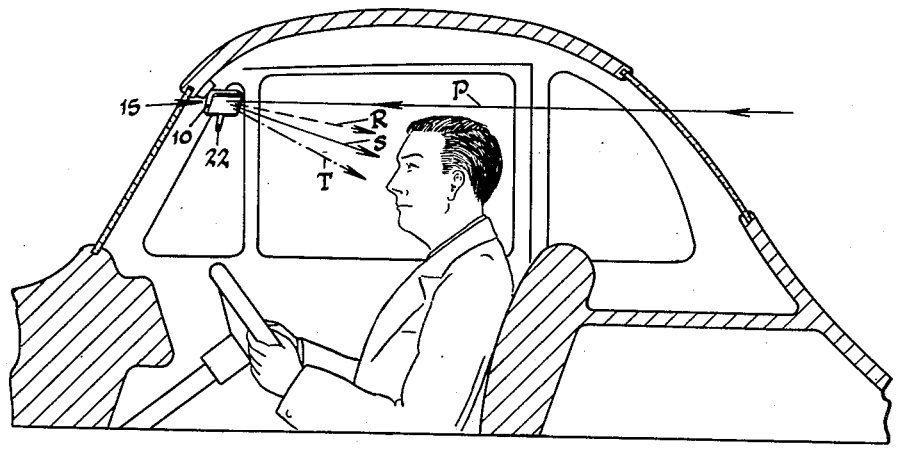
Fig. 3 is a diagrammatic view showing how the mirror is used in an automobile.
Figure 14:
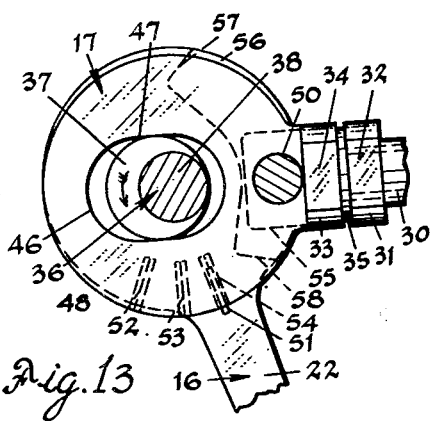
Fig. 14 is a perspective view of the component parts of the mounting shown in disassembled relation.

As shown in Fig. 14, the mounting 15 comprises generally a plurality of cooperating disc members 16, 17 and 18, preferably of substantially uniform diameter, a spring washer 19 and cap 20, all of which are so constructed and associated with one another in such a way that a step by step angular adjustment of the mirror either upwardly or downwardly may be secured when the mirror is supported as shown in Fig. 3 in a suitable position in the automobile as will be more fully hereinafter described.

This stepwise angular adjustment functions to permit the driver to selectively focus alternately to his eyes the images of different light intensities of the limited common field view as indicated by the various rays in Fig. 3, namely, R, S and T, where the image is incident as light upon the mirror as shown by line p. By properly tilting the miror, the lines R, S and T may be selectively brought to the level of the driver's eyes so that he will see the image from the front mirror reflective film means c or the image from the rear reflective film means b as modified by the light transmission of the front mirror reflective means, or a multiple reflected image arising from internal reflections within the prism form.

Figure 4:
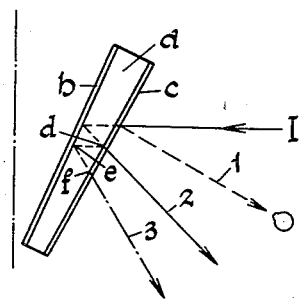
Fig. 4 is a diagrammatic view of the mirror showing how it provides a reflected image from the front mirror surface visible to the driver at the point shown.
Figure 5:
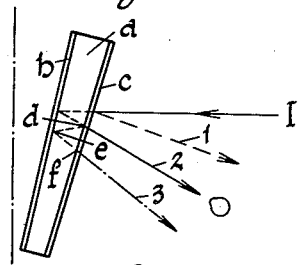
Fig. 5 is a similar view showing how a reflected image visible to the driver is formed by reflection of light from the rear mirror surface.
Figure 6:
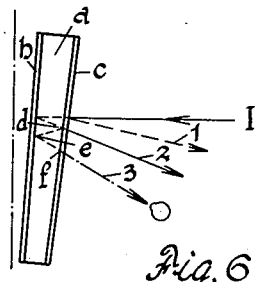
Fig. 6 is a further similar view showing how a third reflected image is formed by reflection from the rear mirror surface by internal reflection within the prism formed by cooperating influence from the front mirror surface.

As shown in Figs. 4, 5 and 6, the light incident upon the mirror device, originating from the object I, is reflected as the several image beams 1, 2 and 3. In each of the figures, beam 1 is a reflection directly from the front mirror means c. This is shown as reflected to the driver's eyes in Fig. 4, but in Figs. 5 and 6 it is reflected above the driver's eyes and is not visible to him. The beams 2 and 3 in Fig. 4 are reflected below the driver's eyes so that he sees the reflected beam 1 only.

In Fig. 5 the reflected beam 2 alone reaches the driver's eyes, and in Fig. 6 the mirror device has been shifted angularly further to bring reflected beam 3 into the driver's eyes. In Fig 5 this same beam 3 is below the normal line of sight of the driver. The selective shifting indicated in Fig. 6 brings beam 3 only into the driver's eyes, and brings the other reflected beams 1 and 2 above the normal line of sight of the driver. The vertical line appearing in each of Figs. 4, 5 and 6 serves to indicate a relative degree of angular shifting of the prism form in those figures.

It will be noted in Figs. 4, 5 and 6 that the reflected beam 1 originates by reflection from the front mirror means c, while the reflected beam 2 results from the first reflection from the rear mirror means b. Such latter beam, however, passes through the front mirror means c twice and is modified by the light transmission of such front mirror means. The incident light is decreased in intensity by the light reflection properties of the front mirror means c and the absorption of light by such reflective means c. Thus, the incident light is reduced by the reflection of beam 1 so that not all the incident light reaches the rear reflective means b. The reflection ability of the rear reflective means b then determines the amount of light returned forwardly, but before the reflected beam issues from the prism form a further reflection occurs at point d by the front mirror means. Thus, the beam 2 is of a reduced intensity as compared to the incident beam.

The origin of beam 3 will be seen to be by internal reflection within the prism form by the cooperative action of the front mirror means of the rear mirror reflective means. Thus, the incident beam after reduction in intensity by light reflected as ray 1 by the front mirror means c passes to the rear mirror reflective means and is reflected back therefrom. As just explained above, this reflected ray passes out of the mirror as beam 2 but in doing so is subject to partial reflection at point d by the front mirror means. Thus, the incident light is further reduced by the loss of ray 2 before the internally reflected light arrives back at the rear mirror reflective means again and is reflected again at point e. Such reflection again exerts a reduction in intensity, and a further reduction in light intensity of the beam 3 occurs as some light is again reflected at point f as the beam passes through the front mirror means.

The mounting 15 is secured in the automobile by means of a threaded stud 21 extended from the edge of the disc member 18 to properly position the mirror which is carried on the disc member 17. Proper adjustment of the disc member 17 relative to disc member 18 to move the mirror carried thereby to predetermined selected position is effected by means of a handle 22 formed as a part of disc member 16. For simplicity of description, the disc member 18 may be referred to as the supporting member or element, disc member 17 as the adjusting member or element, and disc member 16 as the actuating member or element.

The ball 14 of mounting 15 extends through an opening 23 in the back of mirror case 10 and is mounted in a spherical seat or bearing 24 formed in the backing plate 12 in alignment with opening 23. The ball is held in its seat by a metal strap 25 having a central bearing portion 26 conforming to and engaging the ball and secured at its opposite ends to the backing plate as indicated at 27 (Fig. 9). Normal positioning of the mirror is effected by movement thereof about the ball 14, although the surface pressure of the strap 25 in retaining said ball on the spherical seat 24 is sufficient to maintain the mirror against accidental displacement from its normally adjusted position.

Figure 15:
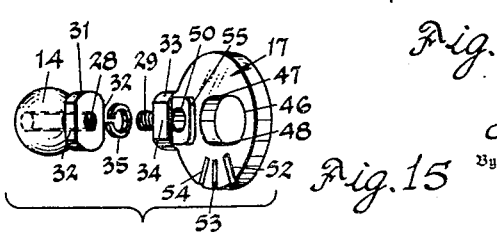
Fig. 15 is a similar view of the parts for mounting the mirror case.

As best illustrated in Fig. 15, the ball 14 is carried by the adjusting member 17 by means of a threaded connection therewith. More particularly, the ball is provided with a tapped opening 28 for receiving therein a threaded shank 29 extending from an integral with the edge of said adjusting member. Preferably, there is projected rearwardly from the ball 14 a reduced stem 30 terminating in a flanged collar 31 having flattened side areas 32 for engagement by a suitable tool to secure said ball on the threaded shank 29. The said threaded shank may also be provided at its inner end with a flanged collar 33 having flattened side areas 34 whereby the ball may be fixedly secured to the adjusting member 17, a lock washer 35 being interposed between the flanged collars 31 and 33 to resist subsequent loosening of the ball 14. The mirror is thus carried by the adjusting member 17 of the mounting with the mirror case 10 being swivelled on the ball 14 so that the said mirror may be initially adjusted to a position most advantageous to the individual requirements of the driver, and then by operation of the actuating member 16 tilted upwardly or downwardly to predetermined selected position.

The members 16, 17 and 18 are so associated with one another that the actuating member 16 will revolve concentrically with respect to the axis of the supporting member 18 while producing cam motions which are transmitted to the adjusting member 17 to cause eccentric movement thereof about the axis of supporting member 18 to effect raising and lowering of the mirror to selected position. To this end, there is formed integral with the inner face of the actuating member 16, axially thereof, a compound shaft 36 including a cam portion 37 and an annular portion 38 extending therefrom and received within an axial opening 39 in supporting member 18. The annular portion 38 constitutes a bearing for the actuating member 16 during rotary movement thereof relative to supporting member 18.

Extending outwardly from and in alignment with the annular bearing portion 38 of shaft 36 is a reduced cylindrical end portion 40 forming a resultant annular shoulder 41. The reduced end portion 40 of the shaft projects beyond the supporting member 18 and the cap 20, provided with a central opening 42, is slipped over said reduced end portion 40 into abutting relation with the shoulder 41. The outer face of the cap is also recessed as at 43 around the opening 42, and the end of the shaft spun over or otherwise formed into a head 44 which interfits within said recess to maintain the members in properly assembled relationship.

Figure 10:
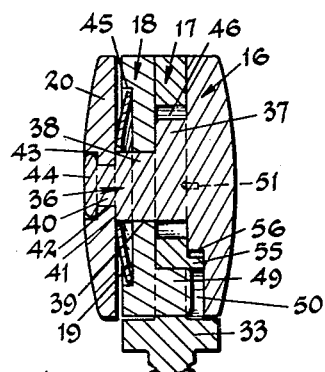
Fig. 10 is a horizontal sectional view through the mounting taken substantially on line 10—10 of Fig. 9.
Figure 11:
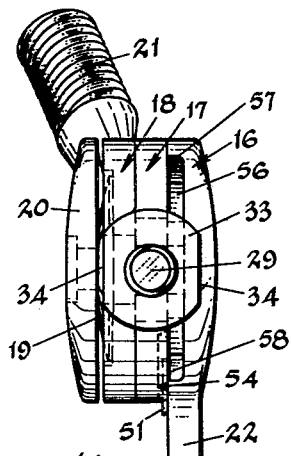
Fig. 11 is an end view of the mirror mounting.

The concave spring washer 19 is interposed between the supporting member 18 and cap 20 to prevent undesirable play between the assembled parts while at the same time exerting sufficient yielding pressure to allow relative movement between members 16, 17 and 18 as necessitated upon swinging movement of the operating handle 22. Preferably, the supporting member 18 is provided with an annular recess 45 for receiving the spring washer 19 so as to bring the cap 20 into closer relationship to the supporting member 18 as shown in Fig. 10, and to impart to the mounting a generally compact, symmetrical and pleasing appearance.

The adjusting member 17 is clamped between members 16 and 18 and is provided with a substantially rectangular slot 46 for receiving the cam portion 37 of the compound shaft 36 of actuating member 16. Upon turning of the cam within said slot first in one direction and then the other, it will alternately engage the upper and lower walls 47 and 48 respectively thereof to cause said member 17 to move upwardly and downwardly with respect to supporting member 18. In order to control such movement of the adjusting member through a definitely defined path to effect tilting of the mirror to desired position, there is projected from the inner face of supporting member 18 a stub axle 49 which is received within a recess 50 in the adjacent face of adjusting member 17 forwardly of slot 46 and in alignment with the threaded shank 29.

Figures 12, 13:
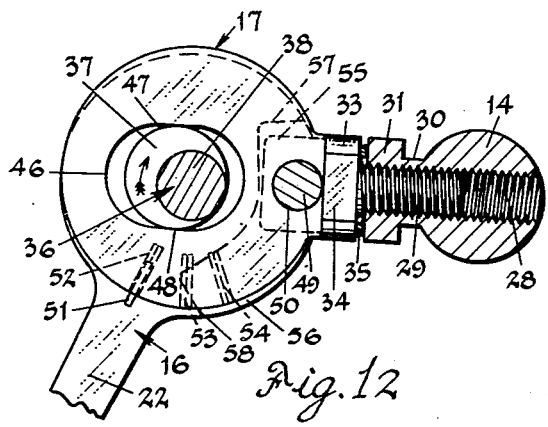
Figs. 12 and 13 are views of the mirror mounting showing the location of the various parts when the mirror is tilted respectively to its extreme upper and lower positions.

As illustrated in Figs. 12 and 13, the adjusting member 17 carrying the mirror will, upon swinging of the handle 22 first in one direction and then the other, be raised and lowered relative to supporting member 18, and simultaneously pivoted about the stub axle 49 in a compound movement to tilt the mirror to either an extreme lower position, an extreme upper position, or to an intermediate position, to obtain the desired mirror intensity. Thus, in Fig. 12, the cam 37 has been rotated, by swinging of the handle 22 rearwardly, to engage the upper wall 47 of slot 46 and to move the adjusting member 17 upwardly with respect to supporting member 18. Simultaneously with this upward movement, the member 17 will be rocked in a clockwise direction about stub axle 49, whereupon the ball end thereof carrying the mirror will be swung downwardly and the mirror thus tilted to its extreme lower position, at which time the image beam 1 will be reflected to the driver's eyes as shown in Fig. 4.

When the mirror is to be tilted to its extreme upper position, as indicated in Fig. 13, the handle 22 is swung forwardly, whereupon the cam 37 engaging the bottom wall 48 of slot 46 will cause the adjusting member 17 to move downwardly with respect to supporting member 18. Concurrently with this movement, the member 17 will rock in a counter-clockwise direction about stub axle 49 to tilt the mirror upwardly to a position where it will reflect the image beam 3 to the driver's eyes as shown in Fig. 6.

Between its extreme upper and lower positions, indicated by broken lines g and h respectively in Fig. 9, the mirror is adapted to assume an intermediate position as shown in full lines midway between broken lines g and h, in which position the image beam 2 will be reflected to the driver's eyes as shown in Fig. 5. At such time, the handle 22 is in a substantially vertical position intermediate its rear position indicated at i when the mirror is tilted downwardly to position h and its forward position indicated at j when the mirror is tilted upwardly to position g.

From the above, it will be seen that upon tilting of the mirror first upwardly and then downwardly, rotation of the cam 37 will effect the displacement of the adjusting member 17 from its normal axial alignment with the members 16 and 18. For the purpose of indicating when the mirror has reached the desired tilted position and for maintainig it in such position, the actuating member 16 has formed thereon a detent 51 which is adapted, upon swinging of handle 22, to selectively engage the three radially disposed grooves 52, 53 and 54 formed in the adjacent face of member 17. Movement of the detent from one groove to another is flexibly resisted by the concave spring washer 19 located between supporting member 18 and cap 20, the expandable characteristics of the spring tending to maintain each of the disc members in surface contact with adjacent members. Thus, rotation of the actuating member 16 by handle 22 will temporarily deflect the spring washer as the detent is moved from one groove to another in tilting the mirror. However, when the detent is brought into registry with one of the grooves, the spring washer will act to effectively snap said detent into said groove in a positive manner and maintain it therein until the handle is again operated. Therefore, by means of the handle 22, which is located within easy reach of the driver, it is possible to effect a step by step adjustment of the mirror by merely swinging said handle forwardly or rearwardly, with locking of the mirror in selected position being accomplished by the coaction of the detent 51 and grooves 52, 53 and 54.

While the location of the grooves 52 and 54 at opposite sides of groove 53 is determined to most advantageously position the mirror upon tilting thereof to produce the desired image reflections therefrom, reception of the detent 51 into either of said grooves 52 and 54 need not, as herein shown, limit possible rotation of the actuating member 16 in either direction. For this purpose, there is provided a positive stop to effectively maintain the rotation of member 16 within definitely defined limits should the handle 22 be moved inadvertently beyond the required range of motion in either direction as defined by the grooves 52 and 54. This stop consists of a boss 55 formed on one face of adjusting member 17 and being received within an arcuately shaped recess 56 in the adjacent face of actuating member 16. Upon excessive swinging movement of the handle 22 to carry detent 51 beyond groove 52 or 54, the boss 55 engaging the end wall 57 or 58 of recess 56 will halt the rotation of the actuating member 16 and keep the handle 22 from being swung beyond predetermined limits.

Figure 7:
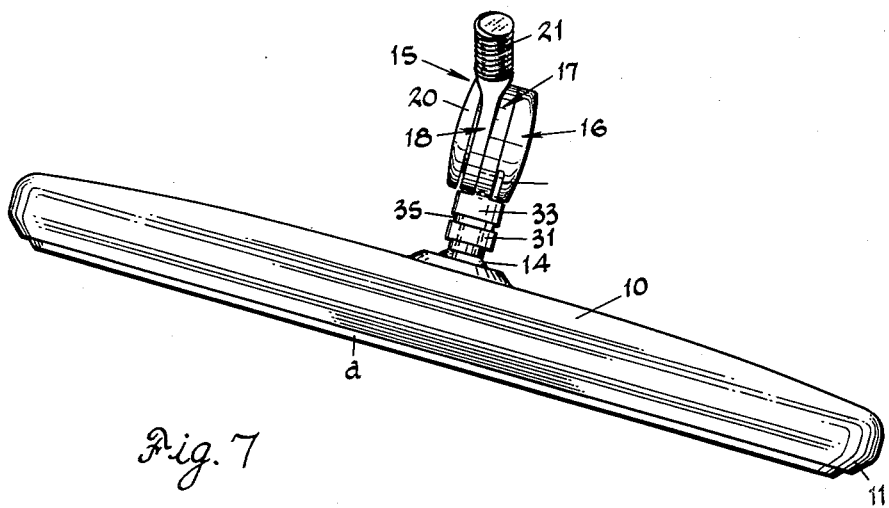
Fig. 7 is a top view of the mirror mounting which is shown in its normal position when secured in an automobile.
Figure 8:
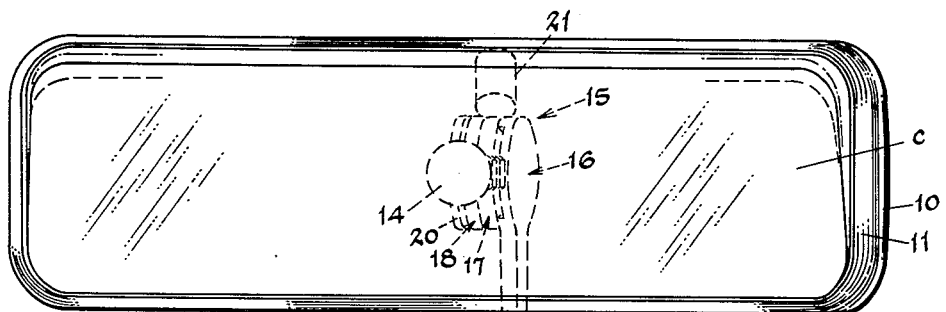
Fig. 8 is a front view of the mirror mounting.

The improved mounting herein provided also embodies means for facilitating the initial positioning of the mirror in an automobile to obtain clear, undistorted reflections and to minimize subsequent adjustments of the mirror by different drivers. This is achieved as shown in Figs. 7 and 8 by arranging the threaded stud 21 at an angle to the supporting member 18. The angle at which the stud extends is such that when it is fixedly secured in an automobile, the mirror will normally be facing at an angle toward the driver as in Fig. 3. Minor adjustment of the mirror can then be made for the individual driver's requirements by bodily swivelling the case 10 upon ball 14.

In use, the mirror is first adjusted upon the supporting ball 14 to the proper angular position for the driver of the automobile, after which the mirror is tilted as above described to selectively bring any one of the light beams 1, 2 or 3 to the driver's eyes. While the mounting thus provides for adjustment of the mirror to give three different light intensities of images of the rear road and traffic conditions, it will be evident that this mounting may be used for supporting and adjusting a two position mirror such as shown in the patent to W. H. Colbert, No. 2,397,947, dated April 9, 1946. The tilting of the mirror can be easily and quickly effected by movement of the handle 22 in the proper direction with the exercise of little or no care or attention on the part of the driver. Likewise, the tilting of the mirror will in no way affect the adjustment of the mirror on the ball 14 to suit the particular driver.

As stated above, no claim is made herein to the particular type of mirror per se or to the make-up or application of the reflection coatings. By way of example, however, and as more fully disclosed in the above-identified copending application of Dwight W. Barkley, Serial No. 788,120, the back mirror reflective means or coating $b$ may be of any material having a high specular reflectivity of 50% to 95% or more. Thus, silver and aluminum of 90% reflectivity are found to be excellent for this purpose. By coating aluminum with a quarter wave length thickness coating of a low index material such as magnesium fluoride and a further quarter wave length thickness of a high index material such as zinc sulfide or titanium dioxide, a multiple coating showing 95% or greater reflectivity may be secured and such a multiple coating may be used as a rear reflective means with advantage as higher reflectivity in the rear reflective means increases generally the brightness of the second, third, and further images. Magnesium, having a reflectivity of 73%; platinum having a reflectivity of 63%; iron having a reflectivity of 55%; chromium having a reflectivity of 55%; nickel having a reflectivity of 60%; and rhodium having a reflectivity of 75%, may also be used. Other materials contemplated are cobalt, iridium, indium, antimony, molybdenum, palladium, cadmium, and other silvery appearing metals.

For the back reflective means or mirror coating $b$, colored reflectors, such as gold of 60% to 80% reflectivity, or copper of 55% to 75% reflectivity, may be used. It is possible to secure such variations in reflectivity value with these or the other metals already given by varying the thickness of such metallic film. A thin film of partially transparent gold backed by an opaque silver mirror may be chosen or semi-transparent reflective layers used as the mirror film $b$, which are colored by light interference effects as disclosed in the copending applications of William H. Colbert and Willard L. Morgan, Serial No. 646,875, filed February 11, 1946, and Serial No. 646,876, filed February 11, 1946, now Patent Nos. 2,519,545 and 2,519,546; and as disclosed in U. S. Patents No. 2,394,533 and No. 2,430,452.

The use of a colored reflective rear surface reflective mirror means or coating $b$ does not of course give any coloration to the front mirror reflection, but does control the color of the reflecting mirror means $b$. The color of the mirror image reflections coming from within the prism form and the general reflectivity intensity of such reflections may also be colored and affected by the use of a colored prism or of colored glass plates. Also, if the front surface mirror film $c$ is colored by selective reflection or by interference effects, not only is the reflection from this surface colored but a color is imparted to the mirror reflection from film $b$, also by reason of the selective colored light transmission of this semi-transparent coating $e$. Thus, the mirror may not only give colored reflections but the several reflections in the different positions of use do not of necessity appear of similar color but are frequently of different colors as well as of different reflectivities.

As suitable materials for the reflective coatings employed in forming the front reflective means, there may be used, by way of example, a semitransparent substantially nonlight absorptive reflecting coating or coating means of or including as a layer a metallic oxide such as titanium dioxide, antimony tetraoxide or pentoxide, chromium sesquioxide, zirconium dioxide, tungsten trioxide, aluminum sesquioxide, beryllium oxide, stannic oxide, or magnesium aluminate or spinel. There may also be used zirconium silicate or zircon. Such materials may be employed directly as single or as multiple coatings as is necessary to provide sufficient reflectivity as hereafter shown. The reflective properties of such coatings vary with the thickness of such coatings and also vary further as light interference effects occur as the thickness is varied. In multiple coatings which operate to give high reflectivity, there may be used low refractive index materials in combination with layers of other higher index materials, such suitable low index materials being magnesium fluoride, magnesium aluminum fluoride or cryolite, calcium fluoride, lithium fluoride, or silicon dioxide.

Preferably, these reflective coatings for the front reflective means are formed by thermal evaporation within a vacuum, although other methods of depositon may be used, and preferably after the coatings of metallic oxide nature are deposited they are subjected to a heat treatment and oxidation as described in a patent application of A. R. Weinrich, Serial No. 783,841, filed November 3, 1947, now Patent No. 2,578,956, in which the thermally evaporated coatings are heated in an oxygen containing atmosphere to reduce the light absorption of the thermally evaporated coating to a minimum. Coatings of the above metallic oxide materials may thus be prepared of less than 2% light absorption and generally of less than 1%. By thermal evaporation alone, coatings of less than 5% light absorption may be prepared in certain cases.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In a mounting for a rear view mirror for automobiles, stationary supporting means adapted for attachment to the automobile, movable adjusting means adapted for attachment to the mirror, actuating means having a portion thereof extending through the adjusting means and supporting means for securing the former to the latter, and means carried by said portion for moving the adjusting means relative to the supporting means to tilt the mirror upwardly or downwardly.

2. In a mounting for a rear view mirror for automobiles, a stationary supporting member having means for attachment to the automobile, a movable adjusting member having means for attachment to the mirror, and an actuating member having a portion thereof extending through the adjusting member and supporting member for clamping the former to the latter, and means carried by said portion for moving the adjusting member relative to the supporting member to tilt the mirror upwardly or downwardly.

3. In a mounting for a rear view mirror for automobiles, a stationary supporting member having means for attachment to the automobile, a movable adjusting member having means for attachment to the mirror, and an actuating member having a portion thereof extending through the adjusting member and supporting member for clamping the adjusting member to the supporting member and including a cam engaging said adjusting member for moving the same relative to said supporting member to tilt the mirror upwardly or downwardly.

4. In a mounting for a rear view mirror for automobiles, a stationary supporting member having means for attachment to the automobile, a movable adjusting member having means for attachment to the mirror, and a rotatable actuating member having a portion thereof extending through the adjusting member and supporting member for clamping the adjusting member to the supporting member, the adjusting member being provided with a slot and the actuating member with a cam received within said slot and caused upon rotation of the actuating member to engage the walls of said slot and move said adjusting member relative to said supporting member to tilt the mirror upwardly or downwardly.

5. In a mounting for a rear view mirror for automobiles, a stationary supporting member having means for attachment to the automobile, a movable adjusting member having means for attachment to the mirror, a rotatable actuating member having a portion thereof extending through the adjusting member and supporting member for clamping the adjusting member to the supporting member and adapted upon rotation thereof to move said adjusting member relative to said supporting member to tilt the mirror upwardly or downwardly, and interengaging means on the actuating member and adjusting member for locating the latter in selected adjusted position and for maintaining it in such position.

6. In a mounting for a rear view mirror for automobiles, a stationary supporting member having means for attachment to the automobile, a movable adjusting member having means for attachment to the mirror, a rotatable actuating member having a portion thereof extending through the adjusting member and supporting member for clamping the adjusting member to the supporting member and adapted upon rotation thereof to move said adjusting member relative to said supporting member to tilt the mirror upwardly or downwardly, said supporting, adjusting and actuating members being arranged side by side, and spring means for maintaining said supporting, adjusting and actuating members in yieldable clamping engagement with one another.

7. In a mounting for a rear view mirror for automobiles, a stationary supporting member having means for attachment to the automobile, a movable adjusting member having means for attachment to the mirror, a rotatable actuating member having a portion thereof extending through the adjusting member and supporting member for clamping the adjusting member to the supporting member and adapted upon rotation thereof to move said adjusting member relative to said supporting member to tilt the mirror upwardly or downwardly, interengaging means on the actuating member and adjusting member for locating the latter in selected adjusted position and for maintaining it in such position, said supporting, adjusting and actuating members being arranged side by side, and spring means for maintaining said supporting, adjusting and actuating members in yieldable clamping engagement with one another.

8. In a mounting for a rear view mirror for automobiles, a stationary supporting member having means for attachment to the automobile, a movable adjusting member having means for attachment to the mirror, a rotatable actuating member having a portion thereof extending through the adjusting member and supporting member for clamping the adjusting member to the supporting member, the adjusting member being provided with a slot and the actuating member with a cam received within said slot and caused upon rotation of the actuating member to engage the walls of said slot and move said adjusting member relative to said supporting member to tilt the mirror upwardly or downwardly, and interengaging means between the supporting member and adjusting member defining an axis about which said adjusting member is rocked upon rotation of said actuating member.

9. In a mounting for a rear view mirror for automobiles, a stationary supporting member having means for attachment to the automobile, a movable adjusting member having means for attachment to the mirror, a rotatable actuating member having a portion thereof extending through the adjusting member and supporting member for clamping the adjusting member to the supporting member, the adjusting member being provided with a slot and the actuating member with a cam received within said slot and caused upon rotation of the actuating member to engage the walls of said slot and move said adjusting member relative to said supporting member to tilt the mirror upwardly or downwardly, interengaging means between the supporting member and adjusting member defining an axis about which said adjusting member is rocked upon rotation of said actuating member, and interengaging tongue and groove means on said adjusting and actuating members for locating the adjusting member in desired position and for maintaining it in such position.

10. In a mounting for a rear view mirror for automobiles, a stationary supporting member having means for attachment to the automobile, a movable adjusting member having means for attachment to the mirror, a rotatable actuating member having a portion thereof extending through the adjusting member and supporting member for clamping the adjusting member to the supporting member, the adjusting member being provided with a slot and the actuating member with a cam received within said slot and caused upon rotation of the actuating member to engage the walls of said slot and move said adjusting member relative to said supporting member to tilt the mirror upwardly or downwardly, interengaging means between the supporting member and adjusting member defining an axis about which said adjusting member is rocked upon rotation of said actuating member, and interengaging means on said adjusting and actuating members acting as a positive stop to limit the movement of the actuating member in either direction.

11. In a mounting for a rear view mirror for automobiles, a stationary supporting member having means for attachment to the automobile, a movable adjusting member having means for attachment to the mirror, a rotatable actuating member having a portion thereof extending through the adjusting member and supporting member for clamping the adjusting member to the supporting member, the adjusting member being provided with a slot and the actuating member with a cam received within said slot and caused upon rotation of the actuating member to engage the walls of said slot and move said adjusting member relative to said supporting member to tilt the mirror upwardly or downwardly, interengaging means between the supporting member and adjusting member defining an axis about which said adjusting member is rocked upon rotation of said actuating member, interengaging means on said adjusting and actuating members for locating the adjusting member in desired position and for maintaining it in such position, and interengaging means also on said adjusting and actuating members acting as a positive stop to limit the movement of the actuating member in either direction.

12. In a mounting for a rear view mirror for automobiles, a stationary supporting member having means for attachment to the automobile, a movable adjusting member having means for attachment to the mirror, and a rotatable actuating member having a shaft portion extending through the adjusting member and the supporting member, means secured to the shaft portion for clamping the adjusting member to the supporting member, the supporting member being provided with a stub axle received within a recess in the adjusting member, said adjusting member being provided with a slot and the actuating member with a cam received within the slot whereby upon rotation of the actuating member said cam will be caused to engage the walls of said slot and move said adjusting member about said stub axle and relative to said supporting member to tilt the mirror upwardly or downwardly.

13. In a mounting for a rear view mirror for automobiles, a stationary supporting member having means for attachment to the automobile, a movable adjusting member having means for attachment to the mirror, a rotatable actuating member having a shaft portion extending through the adjusting member and the supporting member, means secured to the shaft portion for clamping the adjusting member to the supporting member, the supporting member being provided with a stub axle received within a recess in the adjusting member, said adjusting member being provided with a slot and the actuating member with a cam received within the slot and caused upon rotation of the actuating member to engage the walls of said slot and move said adjusting member about said stub axle and relative to said supporting member to tilt the mirror upwardly or downwardly, interengaging tongue and groove means on said adjusting and actuating members for locating the adjusting member in desired adjusted position and for maintaining it in such position, a boss carried by the adjusting member, and an arcuately shaped recess in the actuating member for receiving said boss and cooperating therewith to form a positive stop means for limiting the movement of the actuating member in either direction.

14. In a mounting for a rear view mirror for automobiles, a stationary supporting member having means for attachment to the automobile, a rotatable actuating member having a shaft including a cam portion and a bearing portion, a movable adjusting member located between the supporting and actuating members and having means for attachment to the mirror, said adjusting member having a slot for receiving the cam portion of the shaft therein and the supporting member having an opening for receiving the bearing portion, and means for clamping the supporting, adjusting and actuating members together in side by side relation so that upon rotation of the actuating member the cam portion of said shaft will engage the slot of the adjusting member to move said adjusting member relative to the supporting member to tilt the mirror upwardly or downwardly.

15. In a mounting for a rear view mirror for automobiles, a stationary supporting member having means for attachment to the automobile, a rotatable actuating member having a shaft including a cam portion and a bearing portion, a movable adjusting member located between the supporting and actuating members and having means for attachment to the mirror, said adjusting member having a slot for receiving the cam portion of the shaft therein and the supporting member having an opening for receiving the bearing portion, means for clamping the supporting, adjusting and actuating members together in side by side relation so that upon rotation of the actuating member the cam portion of said shaft will engage the slot of the adjusting member to move said adjusting member relative to the supporting member to tilt the mirror upwardly or downwardly, and a stub axle carried by the supporting member and engaging the adjusting member and defining an axis about which said adjusting member is rocked upon tilting of the mirror.

16. In a mounting for a rear view mirror for automobiles, a stationary supporting member having means for attachment to the automobile, a rotatable actuating member having a shaft including a cam portion and a bearing portion, a movable adjusting member located between the supporting and actuating members and having means for attachment to the mirror, said adjusting member having a slot for receiving the cam portion of the shaft therein and the supporting member having an opening for receiving the bearing portion, means for clamping the supporting, adjusting and actuating members together in side by side relation so that upon rotation of the actuating member the cam portion of said shaft will engage the slot of the adjusting member to move said adjusting member relative to the supporting member to tilt the mirror upwardly or downwardly, a stub axle carried by the supporting member and engaging the adjusting member and defining an axis about which said adjusting member is rocked upon tilting of the mirror, and a spring washer carried on the end of said shaft for maintaining the supporting, adjusting and actuating members in yieldable clamping engagement with one another.

17. In a mounting for a rear view mirror for automobiles, a stationary supporting member having means for attachment to the automobile, a rotatable actuating member having a shaft including a cam portion and a bearing portion, a movable adjusting member located between the supporting and actuating members and having means for attachment to the mirror, said adjusting member having a slot for receiving the cam portion of the shaft therein and the supporting member having an opening for receiving the bearing portion, means for clamping the supporting, adjusting and actuating members together in side by side relation so that upon rotation of the actuating member the cam portion of said shaft will engage the slot of the adjusting member to move said adjusting member relative to the supporting member to tilt the mirror upwardly or downwardly, a stub axle carried by the supporting member and engaging the adjusting member and defining an axis about which said adjusting member is rocked upon tilting of the mirror, and interengaging means on the adjusting member and actuating member for locating the adjusting member in selected adjusted position and for maintaining it in such position.

18. In a mounting for a rear view mirror for automobiles, a stationary supporting member having means for attachment to the automobile, a rotatable actuating member having a shaft including a cam portion and a bearing portion, a movable adjusting member located between the supporting and actuating members and having means for attachment to the mirror, said adjusting member having a slot for receiving the cam portion of the shaft therein and the supporting member having an opening for receiving the bearing portion, means for clamping the supporting, adjusting and actuating members together in side by side relation so that upon rotation of the actuating member the cam portion of said shaft will engage the slot of the adjusting member to move said adjusting member relative to the supporting member to tilt the mirror upwardly or downwardly, a stub axle carried by the supporting member and engaging the adjusting member and defining an axis about which said adjusting member is rocked upon tilting of the mirror, a spring washer carried on the end of said shaft for maintaining the supporting, adjusting and actuating members in yieldable clamping engagement with one another, and interengaging means on the adjusting member and actuating member for locating the adjusting member in selected adjusted position and for maintaining it in such position.

19. In a mounting for a rear view mirror for automobiles, a stationary supporting member having means for attachment to the automobile, a rotatable actuating member having an operating element and a shaft including a cam portion and a bearing portion, a movable adjusting member located between the supporting and actuating members and having means for attachment to the mirror, said supporting, actuating, and adjusting members being of substantially disc form and arranged side by side, the adjusting member having a slot for receiving the cam portion of the shaft therein and the supporting member having an opening for receiving the bearing portion of said shaft, means for clamping the supporting, actuating and adjusting members together, a spring washer on the end of the shaft for yieldably maintaining the supporting, actuating and adjusting members in yieldable clamping relation so that upon operation of said operating element to rotate the actuating member, the cam portion of said shaft will engage the slot of the adjusting member to move said adjusting member relative to the supporting member to tilt the mirror upwardly or downwardly, a stub axle carried by the supporting member and engaging the adjusting member and defining an axis about which said adjusting member is rocked upon tilting of the mirror, interengaging tongue and groove means on the adjusting member and actuating member for locating the mirror in selected adjusted position and for maintaining it in such position, a boss carried by the adjusting member, and an arcuately shaped recess in the actuating member for receiving said boss and cooperating therewith to form a positive stop means for limiting the movement of the actuating member in either direction.

LAURENCE F. HOFER.

References Cited in the file of this patent

UNITED STATES PATENTS

| Number | Name | Date |
|---|---|---|
| 718,731 | Schlicker | Jan. 20, 1903 |
| 1,519,022 | Deisher | Dec. 9, 1924 |
| 1,609,396 | Blonigen | Dec. 7, 1926 |
| 1,615,563 | Atwood et al. | Jan. 25, 1927 |
| 1,679,704 | Barron | Aug. 7, 1928 |
| 1,737,934 | McKinley | Dec. 3, 1929 |
| 2,325,615 | Hodny | Aug. 3, 1943 |
| 2,408,168 | Hofer | Sept. 24, 1946 |

FOREIGN PATENTS

| Number | Country | Date |
|---|---|---|
| 461,005 | Great Britain | Feb. 5, 1937 |